United States Patent
Tso et al.

(10) Patent No.: US 8,962,520 B2
(45) Date of Patent: Feb. 24, 2015

(54) ACTIVATED CARBON/SILICA-GEL/CACL$_2$ COMPOSITE ADSORBENT MATERIAL FOR AIR-CONDITIONING APPLICATIONS AND A METHOD OF PREPARING THE SAME

(75) Inventors: Chi Yan Tso, Hong Kong (CN); Christopher Yu Hang Chao, Hong Kong (CN); Gin Nam Sze-To, Hong Kong (CN)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 2 days.

(21) Appl. No.: 13/448,919

(22) Filed: Apr. 17, 2012

(65) Prior Publication Data

US 2012/0264600 A1 Oct. 18, 2012

Related U.S. Application Data

(60) Provisional application No. 61/457,521, filed on Apr. 18, 2011.

(51) Int. Cl.
*B01J 20/04* (2006.01)
*B01J 20/20* (2006.01)
(Continued)

(52) U.S. Cl.
CPC ............... *B01J 20/046* (2013.01); *B01J 20/20* (2013.01); *B01J 20/28066* (2013.01); *B01J 20/28071* (2013.01); *B01J 20/3234* (2013.01); *B01J 20/3236* (2013.01); *B01J 20/2808* (2013.01); *B01J 20/0237* (2013.01); *B01J 20/28073* (2013.01); *B01J 20/103* (2013.01); *B01J 20/28083* (2013.01); *B01J 20/28085* (2013.01); *B01J 20/0248* (2013.01); *B01D 53/28* (2013.01);
(Continued)

(58) Field of Classification Search
USPC .................................................. 502/413, 416
See application file for complete search history.

(56) References Cited

U.S. PATENT DOCUMENTS 4,388,272 A * 6/1983 Gesteland ..................... 422/501
6,074,972 A 6/2000 Bratton et al.
(Continued)

FOREIGN PATENT DOCUMENTS

CN 1569324 A 1/2005
JP 61178089 A * 8/1986
WO WO 2009002893 A2 * 12/2008

OTHER PUBLICATIONS

Gearoid Foley, Robert DeVault, Richard Sweetser. "The Future of Absorption Technology in America". U.S. DOE Energy Efficiency and Renewable Energy (EERE). Archived from the original on Nov. 28, 2007. Retrieved Dec. 24, 2013.*

(Continued)

*Primary Examiner* — Richard M Rump
(74) *Attorney, Agent, or Firm* — Nath, Goldberg & Meyer; Jerald L. Meyer; Stanley N. Protigal

(57) ABSTRACT

Provided is a composite adsorbent material and a method for preparing the same. The composite adsorbent material comprises a porous host material of activated carbon impregnated with silica-gel and calcium chloride, and is useful for adsorbing high levels of water vapor. The composite adsorbent material is used in low temperature heat driven adsorption cooling and dehumidification systems.

28 Claims, 8 Drawing Sheets

(51) Int. Cl.
  *B01J 20/28* (2006.01)
  *B01J 20/32* (2006.01)
  *B01J 20/02* (2006.01)
  *B01J 20/10* (2006.01)
  *B01D 53/28* (2006.01)
  *F25D 11/00* (2006.01)
  *F25D 11/02* (2006.01)
  *F24F 3/14* (2006.01)

(52) U.S. Cl.
  CPC ............ *F25D 11/006* (2013.01); *F25D 11/025* (2013.01); *B01D 2253/102* (2013.01); *B01D 2253/106* (2013.01); *B01D 2253/25* (2013.01); *F25B 2600/13* (2013.01); *F24F 3/1411* (2013.01)
  USPC .......................................... 502/417; 502/416

(56) References Cited

U.S. PATENT DOCUMENTS

| | | | |
|---|---|---|---|
| 7,143,589 B2 * | 12/2006 | Smith et al. | 62/94 |
| 2009/0209418 A1 * | 8/2009 | Watanabe et al. | 502/405 |
| 2009/0247970 A1 * | 10/2009 | Keleny et al. | 604/333 |

OTHER PUBLICATIONS

Influence of Microporous Characteristics of Activated Carbons on the Performance of an Adsorption Cycle for Refrigeration Stephane Follin, Vincent Goetz, and, and André Guillot Industrial & Engineering Chemistry Research 1996 35 (8), 2632-2639.*

Huang, et al., "Development research on composite adsorbents applied in adsorption heat pump," Applied Thermal Engineering, (2010), vol. 30, pp. 1193-1198.

Wang, et al., "Composite adsorbent of CaCl2 and expanded graphite for adsorption ice maker on fishing boats," International Journal of Refrigeration, (2006), vol. 29, pp. 199-210.

Saha, et al., "A new generation cooling device employing CaCl2-in-silica gel-water system," International Journal of Heat and Mass Transfer, (2009), vol. 52, pp. 516-524.

Li, et al., "Composite Adsorptive Thermal Energy Storage Material Composed of Zeolite 13X and Calcium Chloride," Material Review (Cailiao Daobao) (2005), vol. 19, No. 8, pp. 109-113.

Kimura, et al., "Water adsorption behavior of ordered mesoporous silicas modified with an organosilane composed of hydrophobic alkyl chain and hydrophilic polyethylene composed of hydrophobic alkyl chain and hydrophilic polyethylene oxide groups," Microporous and Mesoporous Materials, (2006), vol. 95, pp. 213-219.

Tokarev, et al., "New composite sorbent CaCl2 in mesopores for sorption cooling/heating," International Journal of Thermal Sciences, (2002), vol. 41, pp. 470-474.

Watanabe, et al., "Operating Limits of Heat Pump Using Adsorption of Structural Active Carbon/Water Vapour," Kagaku Kogaku Ronbunshu, (2002), vol. 41, pp. 38-43.

Yamamoto, et al., "Hydrophilication of Activated Carbon by Impregnating Silica into Pores," Journal of Chemical Engineering of Japan, (2003), vol. 36, No. 3, pp. 348-352.

Wang, et al., "A review on adsorption refrigeration technology and adsorption deterioration in physical adsorption systems," Renewable and Sustainable Energy Reviews, (2010), vol. 14, pp. 344-353.

R.Z. Wang, R.G. Oliveira, "Adsorption refrigeration—An efficient way to make good use of waste heat and solar energy", Progress in Energy and Combustion Science 32, pp. 424-458 (2006).

* cited by examiner

ACTIVATED CARBON/SILICA-GEL/CACL$_2$ COMPOSITE ADSORBENT MATERIAL FOR AIR-CONDITIONING APPLICATIONS AND A METHOD OF PREPARING THE SAME

CROSS-REFERENCE TO RELATED APPLICATIONS

Pursuant to 35 U.S.C. §119(e), this application claims the benefit of U.S. Provisional Application Ser. No. 61/457,521, filed on Apr. 18, 2011 in the name of Chi Yan Tso et al., which is entitled "New Activated Carbon/Silica-gel/CaCl$_2$ Composite Adsorbent for Air-Conditioning Application." The provisional application is hereby incorporated by reference as if it were fully set forth herein.

BACKGROUND OF THE PRESENT SUBJECT MATTER

1. Field of the Present Subject Matter

The present subject matter relates to a composite adsorbent material that can be used in adsorption cooling and dehumidification systems, and a method for preparing the same.

2. Description of Related Art

In recent years, global warming and energy shortages have become more and more serious as economies develop rapidly all over the world. Adsorption cooling systems powered by solar energy or waste heat have drawn increasing attention, as such systems need neither chlorofluorocarbons (CFCs) nor hydrochlorofluorocarbons (HCFCs) as the working fluid, and neither fossil fuel nor electricity to drive them (R. Z. Wang et al, "An energy efficient hybrid system of solar powered water heater and adsorption ice maker," *Solar Energy*, 68 (1), 2000, 189-195; R. Z. Wang et al, "Adsorption refrigeration: green cooling driven by low grade thermal energy," *Chinese Science Bulletin*, 50 (3), 2005, 193-204; X. Q. Zhai et al., "A review for absorption and adsorption solar cooling systems in china," *Renewable and Sustainable Energy Reviews*, 13 (6-7), 2009, 1523-1531; Y. Hamamoto et al., "Study on adsorption refrigeration cycle utilizing activated carbon fibers, part 2: cycle performance evaluation," *International Journal of Refrigeration*, 29 (2), 2006, 315-327).

The working principle of an adsorption cooling system is that a large amount of the composite adsorbents packed in the adsorber adsorbs adsorbate, such as water vapor, from an evacuated container (the evaporator). So, the water in the evaporator continuously evaporates at low pressure to produce cooling which cools the process air. At the same time, the heat produced due to the adsorption of composite adsorbent is removed by cooling water in the adsorber. When the adsorption finishes, the composite adsorbent is heated by hot water/oil to desorb water to the condenser and then returns to the evaporator. Thus, it completes the thermodynamic cycle for both the adsorption and desorption processes. The hot water/oil is heated up by solar energy or waste heat which is free energy from the environment. The two adsorption/desorption chambers of the adsorption cooling systems work alternatively in order to produce the cooling effect continuously (Wang et al., 2000, supra and Zhai et al., 2009, supra).

Today, however, traditional vapor compression systems still dominate in almost all applications, since adsorption cooling has disadvantages that need to be improved. The primary disadvantages are: 1) long adsorption/desorption time; 2) low coefficient of performance (COP), leading to increased energy consumption and cost; and 3) low specific cooling power (SCP), leading to a bulky system. To overcome these problems, the adsorbent-adsorbate pair is a core element in the adsorption cooling system design and one direction is to develop new composite materials as effective adsorbents (Y. Li et al., "Adsorption refrigeration: a survey of novel technologies," *Recent Patents on Engineering*, 1 (1), 2007, 1-21). Greater adsorption capacity can give a higher coefficient of performance. Similarly, a higher adsorption rate allows greater specific cooling power. Therefore, enhancing the adsorption properties, i.e., adsorption capacity and adsorption rate, of the composite adsorbent can definitely increase the value of COP and SCP (Wang et al., 2000, supra).

Silica-gel, activated carbon and zeolite 13X are each common adsorbents used in adsorption cooling systems. Each has its own strengths and weaknesses in terms of adsorption capacity. Zeolite 13X has excellent adsorption capacity at low pressures, but it requires heating to over 100° C. to desorb the adsorbate (R. A. Shigeishi et al., "Solar energy storage using chemical potential changes associated with drying of zeolites," *Solar Energy*, 23 (6), 1979, 489-495), and it cannot adsorb and desorb large quantities of adsorbate within a narrow humidity/pressure range (Wang et al., 2009, supra).

Silica-gel can adsorb average amounts of water vapor at any pressure because of its hydrophilic properties (H. Kakiuchi et al., "Novel zeolite adsorbents and their application for AHP and desiccant system," Presented at the IEA-Annex 17 Meeting, 2004, Beijing).

Activated carbon has a large internal surface area (commonly in the range of 1000-1500 m$^2$ g$^{-1}$) because of its high porosity and high surface reactivity, providing a large capacity for adsorbing chemicals from liquids or gases (A. Swiatkowski, "Industrial carbon adsorbents," *Studies in Surface Science and Catalysis*, 120 (1), 1999, 69-94). Moreover, activated carbon is able to adsorb large amounts of water vapor at pressures above 1600 Pa. However, its water adsorption capacity at low pressures is weak. For an adsorption cooling system, a desirable adsorbent should have an S-shape adsorption isotherm with huge adsorption capacity at pressures from 750 Pa to 1100 Pa (Kakiuchi et al., 2004, supra). Activated carbon has an S-shape isotherm at such pressure range, but its adsorption capacity is low (R. A. Shigeishi et al., "Solar energy storage using chemical potential changes associated with drying of zeolites," *Solar Energy*, 23 (6), 1979, 489-495).

There is a study showing that the best concentration of sodium silicate solution is around 0.1 to 10 wt. % for 48 hours of impregnation time (H. Huang et al., "Development research on composite adsorbents applied in adsorption heat pump," *Applied Thermal Engineering*, 30, 2010, 1193-1198). However, the study did not test the effect of impregnating CaCl$_2$ into the pores of activated carbon. It only studied the performance between activated carbon and silica-gel.

Silica-gel and activated carbon were employed for a composite material for adsorbent in order to achieve good performance in adsorption capacity (Huang et al., 2010, supra). CaCl$_2$ and expanded graphite were used as adsorbents for an adsorption ice maker on fishing boats (Wang et al., 2006, supra). A new generation cooling device employing CaCl$_2$ and silica gel as composite adsorbents was developed (B. B. Saha et al., "A new generation cooling device employing CaCl$_2$-in-silica gel-water system," *International Journal of Heat and Mass Transfer*, 52, 2009, 516-524). In addition, zeolite 13X and CaCl$_2$ were used as composite adsorbents in an adsorption cooling/heating system (J. Li et al., "Composite adsorptive thermal energy storage material composed of zeolite 13X and calcium chloride," *Material Review (Cailiao Daobao)*, 19 No. 8, 2005, 109-113). Most of the composite adsorbents were found to enhance the SCP and COP. However, the adsorption capacity, COP and SCP of the adsorbents are still quite low.

Currently, only silica-gel is commercially used in adsorption cooling and dehumidification systems, because silica-gel can adsorb an average amount of water vapor at any pressure level due to its hydrophilic properties.

Accordingly, there has been a desire for a better composite adsorbent material for use in cooling systems and dehumidification systems.

SUMMARY OF THE PRESENT SUBJECT MATTER

A good composite adsorbent material can be prepared by impregnating the micropores/mesopores of silica activated carbon with an inorganic salt, such as $CaCl_2$ Experiments have shown that $CaCl_2$ can adsorb approximately 0.9 g of water vapor per gram of $CaCl_2$ at room temperature and pressure. That is why $CaCl_2$ is one of the adsorbents most widely used in dehumidifier boxes. Therefore, if it were possible to develop a high density composite adsorbent by impregnating the pores of activated carbon with both silica-gel and $CaCl_2$, it might not only improve the adsorption capacity at low pressures, but also enhance the overall adsorption capacity and adsorption rate. If so, both the COP and the SCP of adsorption cooling systems could be improved.

Based on this concept, a composite adsorbent material comprising all of active carbon, silica-gel and $CaCl_2$ has been successfully prepared, which can adsorb up to 0.23 grams of water vapor per gram of the dry adsorbent at 900 Pa, which is a 933% improvement over raw activated carbon. This composite adsorbent material has great potential as an adsorbent in adsorption cooling systems. At the same time, a 0.805 g g$^{-1}$ of difference in equilibrium water uptake between 25° C. and 115° C. was recorded at atmospheric pressure, which was a 324% improvement over raw activated carbon. Accordingly, it also has a great potential as an adsorbent in dehumidification systems. Overall, the results demonstrated that the composite adsorbent material can be a good candidate for adsorption cooling and dehumidification systems.

Accordingly, an aspect of the present subject matter is directed to a composite adsorbent material comprising a porous host matrix or material of activated carbon impregnated with silica-gel and $CaCl_2$. The composite adsorbent preferably has a size ranging from about 20 to about 40 mesh in diameter, and the host matrix of activated carbon preferably has an average pore size of about 5 Å to about 20 Å in diameter. The activated carbon as a host material preferably has a total pore volume of about 0.4 cm$^3$ g$^{-1}$ to about 1.0 cm$^3$ g$^{-1}$ and preferably a total surface area of from about 1100 m$^2$ g$^{-1}$ to about 1200 m$^2$ g$^{-1}$.

Another aspect of the present subject matter is directed to a method of preparing the composite adsorbent material used in adsorption cooling systems or dehumidification systems comprising preparing a porous host material of activated carbon and impregnating the porous host material with a sodium silicate solution, followed by a $CaCl_2$ solution. For the composite adsorbent to be used in dehumidification systems, it preferably comprises about 30 to about 35 wt. % of activated carbon, about 2 to about 10 wt. % of silica-gel and about 55 to about 68 wt. % of $CaCl_2$. For the composite adsorbent to be used in adsorption cooling systems, it preferably comprises about 60 to about 70 wt. % of activated carbon, about 10 to about 15 wt. % of silica-gel and about 15 to about 30 wt. % of $CaCl_2$.

Still another aspect of the present subject matter is directed to a humidity-controlling system comprising a desiccant wheel dehumidification unit, where water is used as an adsorbate and the presently provided composite adsorbent material is used as an adsorbent. A cooling or temperature-controlling system comprising an adsorption unit, where water, methanol and ammonia are used as adsorbates and the presently provided composite adsorbent material is used as an adsorbent, is also one aspect of the present subject matter.

BRIEF DESCRIPTION OF DRAWINGS

Various embodiments will now be described in detail with reference to the accompanying drawings.

DETAILED DESCRIPTION OF PARTICULAR EMBODIMENTS

Figure 1:
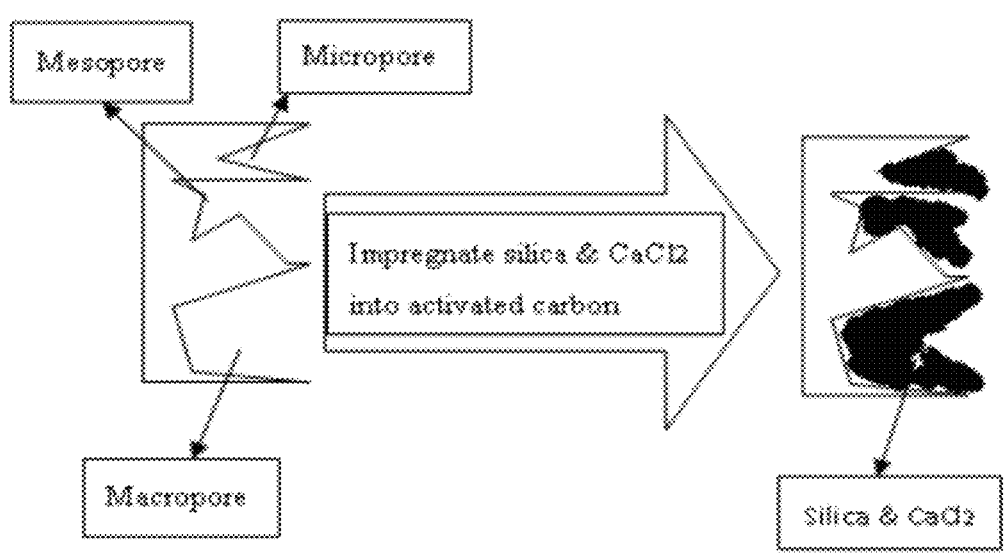
FIG. 1 illustrates a scheme for the concept of impregnating silica-gel and $CaCl_2$ into activated carbon.

The term "a" or "an" as used herein includes the singular and the plural, unless specifically stated otherwise. Therefore, the term "a," "an" or "at least one" can be used interchangeably in this application.

Throughout the application, various embodiments are described using the term "comprising"; however, it will be understood by one of skill in the art, that in some specific instances, an embodiment can alternatively be described using the language "consisting essentially of" or "consisting of:"

For purposes of better understanding the present subject matter and in no way limiting the scope of the present subject matter, unless otherwise indicated, all numbers expressing quantities, percentages or proportions, and other numerical values used herein, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Other terms as used herein are meant to be defined by their well-known meanings in the art.

A new hydrophilic method for achieving high performance adsorbents by impregnating the pores of activated carbon with silica-gel and $CaCl_2$ has been developed. The composite adsorbent material is a combination of three different types of physical adsorbents, that is, silica-gel, $CaCl_2$ and activated carbon in which activated carbon is the host matrix or material. The composite adsorbent material can be used in solar adsorption cooling systems and dehumidification systems.

The function of impregnating silica-gel is to increase the performance of adsorption capacity at a lower pressure region which is a novel and an unusual feature. The aim of impregnating $CaCl_2$ is to further increase the overall performance of adsorption capacity at a wider pressure range. No prior art has ever described or discussed the possibility of combining and fully harnessing the advantages of these three adsorbents to conceive this novel composite material.

Activated carbon has high thermal conductivity and its adsorption capacity under high pressure conditions is outstanding. However, the performance in the low pressure region of activated carbon is quite poor. The drawback is solved herein by impregnating the pores of activated carbon with silica-gel since silica-gel has a good performance of adsorption capacity under low pressure conditions. Calcium Chloride ($CaCl_2$) is another excellent chemical adsorbent which has very high adsorption capacity toward water vapor, but $CaCl_2$ alone cannot maintain its solid structure as it will form a solution with the water vapor. By impregnating the pores of activate carbon with $CaCl_2$, the shortcomings of activated carbon can be overcome and it also serves as a substrate material to hold the aqueous $CaCl_2$. Impregnating the pores of activated carbon with silica-gel and $CaCl_2$ not only can solve the problem of adsorption capacity at relative law pressure range, but also can enhance the overall adsorption capacity. To conclude, silica-gel and $CaCl_2$ can compensate the drawbacks of the activated carbon. They are complementary to each other.

The composite adsorbent material of the present subject matter comprising activated carbon as a host material which is impregnated with silica-gel and $CaCl_2$ has an adsorption capacity significantly higher than other composite adsorbents known in the art by at least about 50%. The performance of the composite adsorbent is more stable for use in adsorption chiller and dehumidification systems and it can adsorb a huge amount of water vapor in the low pressure region as well as the high pressure region. In addition, the composite adsorbent material has higher cycling time and can be reused many times. Since most of the pores of activated carbon are impregnated with silica-gel and $CaCl_2$, the thermal conductivity is also enhanced. Also, the composite adsorbent after use in the adsorption process maintains its solid structure and never becomes a solution after adsorption.

One of the major applications of the composite adsorbent material according to the present subject matter is for making adsorbents used in solar adsorption cooling air conditioning systems and dehumidification systems. The Heating, Ventilating and Air Conditioning (HVAC) industry, renewable energy industry, solar energy industry, other industries that generate waste heat during production and building owners will directly benefit from this technology. The solar energy industry can benefit from having one more application as this adsorption cooling system can be powered by solar energy, meaning that the industry can have more variety. In addition, it is economical for households. Electricity charges can be reduced by using air-conditioners with this energy-efficient adsorption cooling system. 50% of energy can be conserved as compared with the existing cooling systems.

Activated carbon used in the composite adsorbent material as a host matrix or material is hydrophobic, generally having pores with a radius of 0.3 to 10 nm and a large volume of micropore and mesopore more than 1 nm. Hydrophilicity of activated carbon can be realized by impregnating the pores by silica-gel, which is hydrophilic, and with $CaCl_2$. The concept of impregnating activated carbon having micropore, mesopore and macropore is depicted in FIG. 1.

Any type of activated carbons with different pore distribution may be used in preparing the presently provided composite adsorbent material. Different types of activated carbons, such as, for example, chemical activated carbon or steam activated carbon can be used in the present subject matter and they are commercially available from, e.g., Takeda Pharmaceutical Co., Ltd., Taihei Kagaku Co., Ltd. or Kanebo Co., Ltd. Activated carbon may also be prepared according to a method known in the art. In addition, activated carbon used in the present subject matter may be in the form of granules.

Figure 2A:
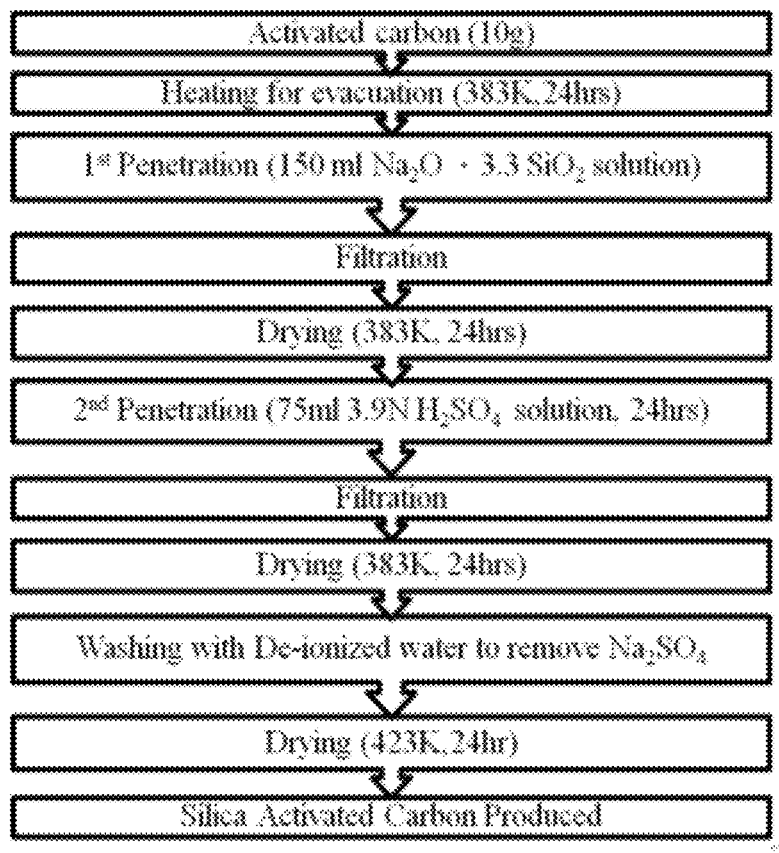
FIG. 2A illustrates a scheme for impregnating hydrophilic silica-gel to activated carbon to obtain silica activated carbon.

The process for impregnating activated carbon with silica-gel is described in FIG. 2A. As a source of silica-gel, sodium silicate solution is used. The silica activated carbon can be obtained under various experimental conditions. Sodium silicate solution may be prepared to have a concentration of 0.1 to 10 wt. %, preferably 10 wt. %, and the impregnation time may be 1 to 72 hours, preferably 48 hours. The temperature may be about 300 K to 450 K, preferably about 383 K to 423 K. Also, impregnation may be performed one time or repeated twice in the same concentration or in a different concentration. To prevent the dissolution of silicic acid from the activated carbon, the neutralization process of sodium silicate is preferably processed into two stages: i. activated carbon is impregnated with a sufficient amount of sodium silicate and dried, and then ii. sulphuric acid is added. A silica monomer can be made from sodium silicate and sulphuric acid by the following reaction: $Na_2O \cdot 3.3SiO_2 + H_2SO_4 + 5.6\ H_2O \rightarrow 3.3\ Si(OH)_4 + Na_2SO_4$. After heating up and aging, the following dehydrate-condensation reaction may occur: $2\ Si(OH)_4 \rightarrow (OH)_3Si\mathrm{-\!O\!-}Si(OH)_3 + H_2O$.

Figure 3:
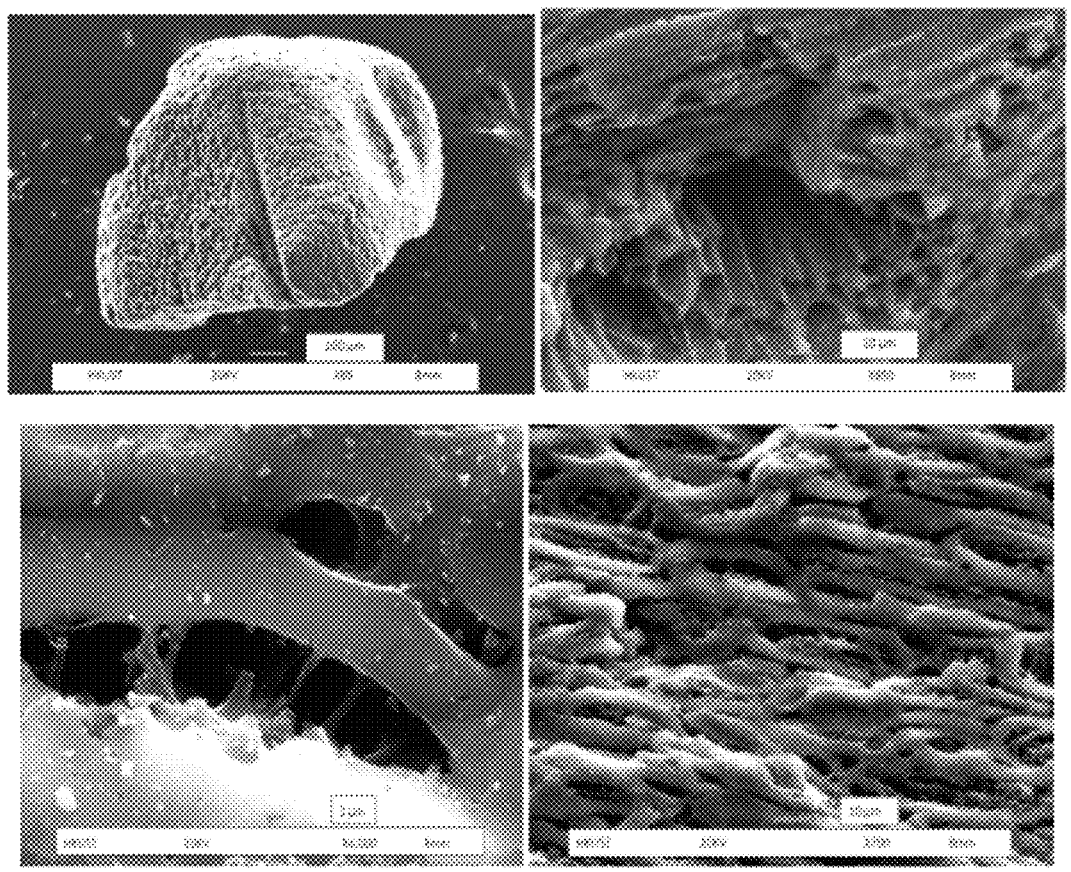
FIG. 3 illustrates Scanning electron microscope (SEM) images of activated carbon before impregnation.
Figure 4:
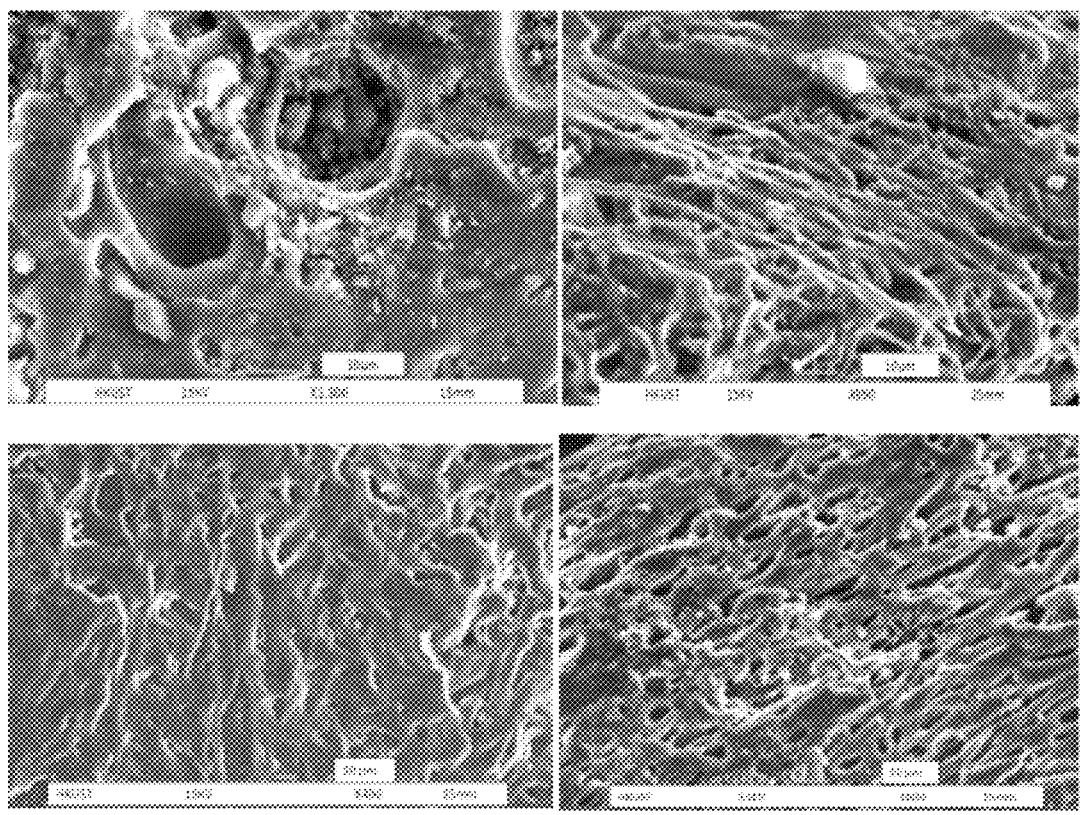
FIG. 4 illustrates SEM images of activated carbon samples after impregnation.
Figure 5:
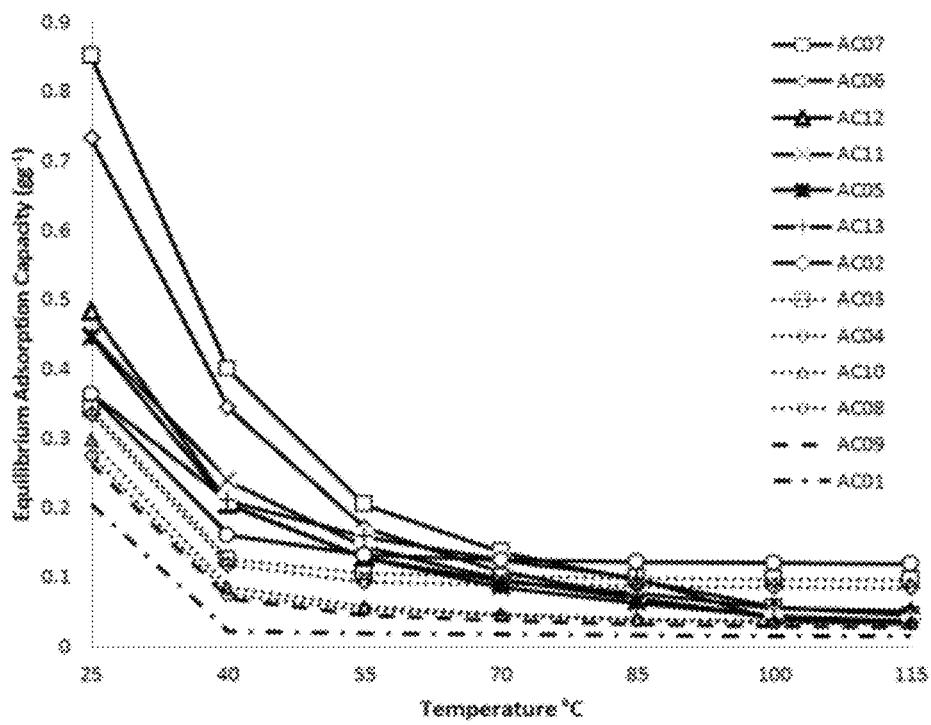
FIG. 5 illustrates Thermogravimetric analysis (TGA) results of different composite adsorbent samples at atmospheric pressure.

The obtained silica activated carbon is preferably then impregnated with $CaCl_2$ solution. The concentration of $CaCl_2$ solution may be 1 to 46 wt. %, preferably 10 wt. %, 30 wt. % or 46 wt. %, which is the saturation concentration. The impregnation time may be 1 to 72 hours, preferably 24 hours, 48 hours or 72 hours. SEM images of the activated carbon before impregnation (or penetration) are shown in FIG. 3 and SEM images of the activated carbon after penetration are shown in FIG. 4.

The adsorbent properties of the composite materials prepared are evaluated by adsorption isotherms, pore size analysis, surface observation and the amount of impregnated silica-gel and $CaCl_2$. For the evaluation, Brunauer-Emmett-Teller (BET), X-ray photoelectron (XPS), thermogravimetric analysis (TGA), low pressure TGA, ideal COP and average SCP results of the composite adsorbent are measured and calculated using the methods known in the art with respect to each analysis, and they are presented in Tables 2 to 7 and FIG. 5-11.

According to the data, the activated carbon in the composite adsorbent can have a pore size ranging from about 5 Å to about 20 Å in diameter. The host matrix of activated carbon in the composite can have about 0.43 $cm^3\ g^{-1}$ of microporosity, about 0.44 cm$^3$ g$^{-1}$ of mesoporosity, and about 0.02 cm$^3$ g$^{-1}$ of macroporosity. The host matrix can be in the form of activated carbon granules. In addition, the composite adsorbent can have a size ranging from about 20 to 40 mesh in diameter. Regarding the pore volume, the host matrix of activated carbon in the composite adsorbent can have a total pore volume from about 0.4 cm$^3$ g$^{-1}$ to about 1.0 cm$^3$ g$^{-1}$, with about 0.5 cm$^3$ g$^{-1}$ being preferred, and a total surface area of from about 1100 m$^2$ g$^{-1}$ to about 1200 m$^2$ g$^{-1}$.

In one embodiment, the composite adsorbent for use in dehumidification systems comprises about 30 to about 35 wt. % of activated carbon, about 2 to about 10 wt. % of silica-gel and about 55 to about 68 wt. % of CaCl$_2$. In another embodiment, the composite adsorbent for use in adsorption cooling systems comprises about 60 to about 70 wt. % of activated carbon, about 10 to about 15 wt. % of silica-gel and about 15 to about 30 wt. % of CaCl$_2$. The optimized condition for adsorption cooling systems was obtained when raw activated carbon was impregnated by soaking in about 10 wt. % sodium silicate solution for about 48 hours and then in about 30 wt. % CaCl$_2$ solution for about 48 hours. This provides a maximum adsorption rate at a concentration of about 30 wt. % of calcium chloride solution. And, the optimized condition for dehumidification systems was obtained when raw activated carbon was impregnated by soaking in about 10 wt. % sodium silicate solution for about 48 hours and then in about 46 wt. % CaCl$_2$ solution for about 72 hours.

When used in an open dehumidification system, the present composite adsorbent material is capable of adsorbing at least about 0.86 gram of water vapor for every gram of the composite adsorbent material at room pressure. Likewise, when used in adsorption cooling systems, the present composite adsorbent material is capable of adsorbing at least about 0.23 gram of water vapor for every gram of the composite adsorbent material at a 900 Pa low pressure condition.

The composite material is particularly useful for adsorbing high levels of water vapor and to be used in low temperature heat driven adsorption cooling and dehumidification systems. The composite adsorbent material used in adsorption cooling and dehumidification systems shows an S-shape adsorption isotherm curve.

The composite adsorbent material used in adsorption cooling systems can achieve an ideal COP of 0.7 and an average SCP of 378 W Kg$^{-1}$.

The composite adsorbent material may further comprise a metal that is impregnated onto the activated carbon. To further improve the thermal conductivity of the composite adsorbent material, the activated carbon may be further impregnated with a certain metal, such as for example, copper or aluminum.

The composite adsorbent material of the present subject matter may be used as an adsorbent in a humidity-controlling system comprising a desiccant wheel dehumidification unit where water is used as an adsorbate. The composite adsorbent material may also be used as an adsorbent in a cooling or temperature-controlling system comprising an adsorption unit where water, methanol and ammonia are used as adsorbates.

EXAMPLES

The various embodiments of the present subject matter are further described by the following examples, which should not be interpreted as limiting the scope of the present subject matter.

Preparation of Samples

Examples 1 to 9

Sample Nos. AC05 to AC13

Nine (9) samples of the composite adsorbent material were prepared according to the method described below, under various experimental conditions with respect to the impregnation time and the concentration of sodium silicate solution and CaCl$_2$ solution. A solution of sodium silicate was bought from Sigma-Aldrich Company (product number: 338443). A solution of CaCl$_2$ was prepared by adding a water-soluble, anhydrous calcium chloride salt to deionized water in which calcium chloride (product number: C4901) was in powder form and was bought from Sigma-Aldrich Company as well.

The initial impregnation of silica-gel onto the pores of the activated carbon used as a host material was processed according to the sequence shown in FIG. 2A. 10 g of activated carbon (Sigma-Aldrich Company, product number: 10275) was heated for 24 hours at 383 K for evacuation, and then a first penetration was performed with 150 ml of Na$_2$O.3.3SiO$_2$ solution (sodium silicate concentration: 10 wt. %), followed by filtration. After drying the resulting product at 383 K for 24 hours, a second penetration was performed for 24 hours with 75 ml of 3.9N H$_2$SO$_4$ solution. After filtration and drying the resulting product under the same conditions as previous, it was washed with deionized water to remove Na$_2$SO$_4$. After drying the resulting product at 423 K for 24 hours, a silica activated carbon composite was produced.

Figure 2B:
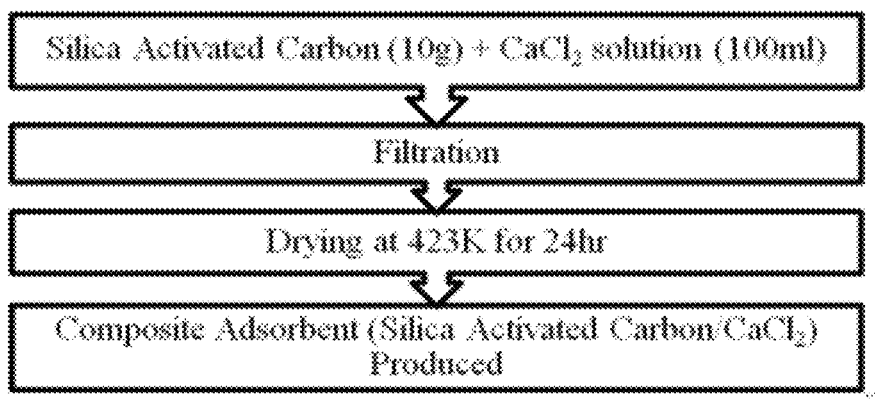
FIG. 2B illustrates a scheme for impregnating $CaCl_2$ to silica-gel activated carbon to obtain a composite of silica-gel activated carbon/$CaCl_2$.

The subsequent CaCl$_2$ impregnation was processed using another process shown in FIG. 2B. Samples were made under different experimental conditions. CaCl$_2$ concentration was first considered using 10 wt. %, 30 wt. %, and 46 wt. % which is the saturation concentration. Apart from that, impregnation time also plays an important role to affect the wt. % of CaCl$_2$ in the pores of activated carbon. Thus, three different impregnation times which are 24 hours, 48 hours and 72 hours, were used respectively.

In particular, 10 g of silica activated carbon was contacted with 100 ml of CaCl$_2$ solution. After filtration and drying at 423 K for 24 hours, a composite adsorbent material of silica activated carbon/CaCl$_2$ was produced.

As a control group, the raw material, i.e., non-impregnated activated carbon, was used.

Comparative Examples 1 to 3

Sample Nos. AC02 to AC04

For comparison, three (3) samples of activated carbon/silica-gel composite material (AC02, AC03 and AC04) were prepared according to the process described above for producing silica-gel activated carbon (FIG. 2A), with different impregnation times of 24 hours, 48 hours and 72 hours.

All of the thirteen (13) samples prepared were shown in Table 1, including the untreated activated carbon (control). Comparative Examples 1 to 3 (AC02 to AC04) involve impregnation with only silica with different impregnation times, and Examples 1 to 9 (AC05 to AC13) involve impregnation with silica and CaCl$_2$ with different impregnation times and concentrations. SEM images of the samples are presented in FIG. 3 and FIG. 4.

TABLE 1

| Examples | Sample number | sodium silicate solution impregnation time | sodium silicate solution concentration | CaCl₂ in solution concentration | CaCl₂ solution impregnation time |
|---|---|---|---|---|---|
| Control | AC01 (raw) | N.A. | N.A. | N.A. | N.A. |
| Comparative Example 1 | AC02 | 24 hours | 10 wt. % | N.A. | N.A. |
| Comparative Example 2 | AC03 | 48 hours | 10 wt. % | N.A. | N.A. |
| Comparative Example 3 | AC04 | 72 hours | 10 wt. % | N.A. | N.A. |
| Example 1 | AC05 | 48 hours | 10 wt. % | 46 wt. % (saturation) | 24 hours |
| Example 2 | AC06 | 48 hours | 10 wt. % | 46 wt. % (saturation) | 48 hours |
| Example 3 | AC07 | 48 hours | 10 wt. % | 46 wt. % (saturation) | 72 hours |
| Example 4 | AC08 | 48 hours | 10 wt. % | 10 wt. % | 24 hours |
| Example 5 | AC09 | 48 hours | 10 wt. % | 10 wt. % | 48 hours |
| Example 6 | AC10 | 48 hours | 10 wt. % | 10 wt. % | 72 hours |
| Example 7 | AC11 | 48 hours | 10 wt. % | 30 wt. % | 24 hours |
| Example 8 | AC12 | 48 hours | 10 wt. % | 30 wt. % | 48 hours |
| Example 9 | AC13 | 48 hours | 10 wt. % | 30 wt. % | 72 hours |

Experimental Examples

To evaluate the properties of all the samples, Brunauer-Emmett-Teller (BET), X-ray photoelectron (XPS), thermogravimetric analysis (TGA) and low pressure TGA analyses were performed. The results of the analyses to the composite adsorbent materials are presented in the following tables and figures in this application.

Example 10

Surface Area and Pore Volume

The surface area and pore volume of the samples were measured using the Brunauer-Emmett-Teller (BET) method (H. Huang et al., "Development research on composite adsorbents applied in adsorption heat pump," *Applied Thermal Engineering*, 30, (2010) 1193-1198), as shown in Table 2.

The particle size of the thirteen samples were almost the same, which were around 20-40 mesh. It is clearly shown that the factor of impregnation time does not hugely affect the surface area and pore volume. Compared with AC02 to AC04 (Comparative Examples 1 to 3), AC05 to AC07 (Examples 1 to 3), AC08 to AC10 (Examples 4 to 6) and AC11 to AC13 (Examples 7 to 9), the results were quite close with each other. However, there was a fairly huge difference among each group.

Certainly, AC01 (control) showed the largest surface area and pore volume since there were a lot of micropores/mesopores in the raw activated carbon. The smallest number of surface area and pore volume went to the series of AC05 to AC07 (Examples 1 to 3), which is because the salt concentration of CaCl₂ was 46% which is the saturated concentration so the pores of AC05-AC07 were full of CaCl₂.

TABLE 2

Specific surface areas and total pore volumes of the samples.

| Sample No. | $S_{BET}$ (m² g⁻¹) | Total Pore Volume (cm³ g⁻¹) |
|---|---|---|
| AC01 | 1117 | 0.5329 |
| AC02 | 610 | 0.2934 |
| AC03 | 664 | 0.3121 |
| AC04 | 682 | 0.3242 |
| AC05 | 118 | 0.0740 |
| AC06 | 82 | 0.0449 |
| AC07 | 83 | 0.0589 |
| AC08 | 602 | 0.2895 |
| AC09 | 626 | 0.2975 |
| AC10 | 680 | 0.3270 |
| AC11 | 156 | 0.0812 |
| AC12 | 160 | 0.0882 |
| AC13 | 188 | 0.0958 |

Example 11

X-ray Photoelectron Spectroscopy

X-ray Photoelectron Spectroscopy (XPS) analysis was performed in order to make sure that all components were impregnated into the pores of activated carbon, and the results are shown in Table 3. Based on the results from the XPS analysis, the composite adsorbent for use in dehumidification systems comprises about 30 to about 35 wt. % of activated carbon, about 2 to about 10 wt. % of silica-gel and about 55 to about 68 wt. % of CaCl₂. And, the composite adsorbent for use in adsorption cooling systems comprises about 60 to about 70 wt. % of activated carbon, about 10 to about 15 wt. % of silica-gel and about 15 to about 30 wt. % of CaCl₂.

TABLE 3

X-ray photoelectron spectroscopy of samples. (Error: ±5%)

| Examples | Sample No. | XPS Wt. % of Activated Carbon | Wt. % of Silica | Wt. % of CaCl₂ |
|---|---|---|---|---|
| Control | AC01 (raw) | 100 | 0 | 0 |
| Comparative Example 1 | AC02 | 84 | 16 | N.A. |
| Comparative Example 2 | AC03 | 74 | 26 | N.A. |
| Comparative Example 3 | AC04 | 81 | 19 | N.A. |
| Example 1 | AC05 | 30 | 2 | 68 |
| Example 2 | AC06 | 39 | 4 | 57 |
| Example 3 | AC07 | 33 | 3 | 64 |
| Example 4 | AC08 | 69 | 20 | 11 |
| Example 5 | AC09 | 63 | 24 | 13 |
| Example 6 | AC10 | 74 | 22 | 4 |
| Example 7 | AC11 | 73 | 22 | 5 |
| Example 8 | AC12 | 66 | 13 | 21 |
| Example 9 | AC13 | 75 | 10 | 15 |

Example 12

Adsorption Capacity

It was found that the more CaCl₂ inside the pores of activated carbon, the better performance of the adsorption capacity. Further, it was found that the best optimized condition was obtained when the activated carbon was impregnated with 10 wt. % of sodium silicate solution for 48 hours and 46 wt. % of CaCl$_2$ solution for 72 hours (i.e., Example 3; Sample AC07) in which the difference in equilibrium adsorption capacities between adsorption and desorption phases could reach 0.805 g g$^{-1}$ and this makes a 324% improvement, compared with the raw activated carbon based on TGA analysis. The results are shown in Table 4 and FIG. 5.

TABLE 4

The difference in equilibrium water uptake between 25° C. and 115° C., Δx, and the percentage improvement compared with raw activated carbon at atmospheric pressure

| Sample | Δx (g g$^{-1}$) | % Improvement | Sample | Δx (g g$^{-1}$) | % Improvement |
|---|---|---|---|---|---|
| AC02 | 0.244 | 28% | AC08 | 0.243 | 28% |
| AC03 | 0.246 | 29% | AC09 | 0.236 | 24% |
| AC04 | 0.250 | 32% | AC10 | 0.264 | 39% |
| AC05 | 0.410 | 116% | AC11 | 0.412 | 117% |
| AC06 | 0.699 | 268% | AC12 | 0.433 | 128% |
| AC07 | 0.805 | 324% | AC13 | 0.332 | 69% |
| AC01 | 0.19 | N.A. | | | |

Figure 6:
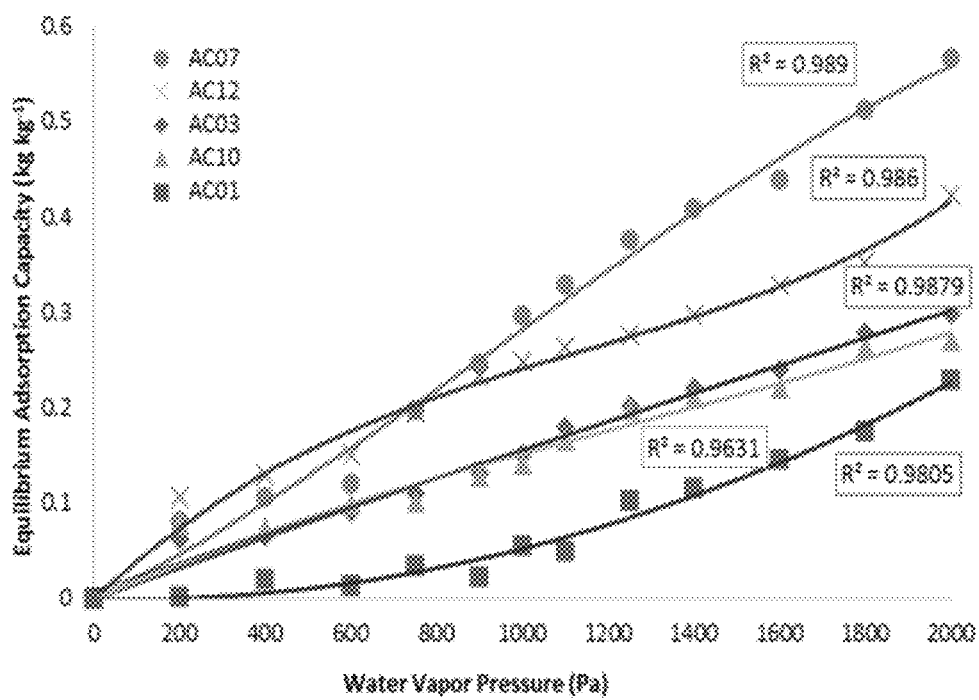
FIG. 6 illustrates graphs showing water adsorption isotherms of the AC01, AC03, AC07, AC10 and AC12 samples at 300 K.
Figure 7:
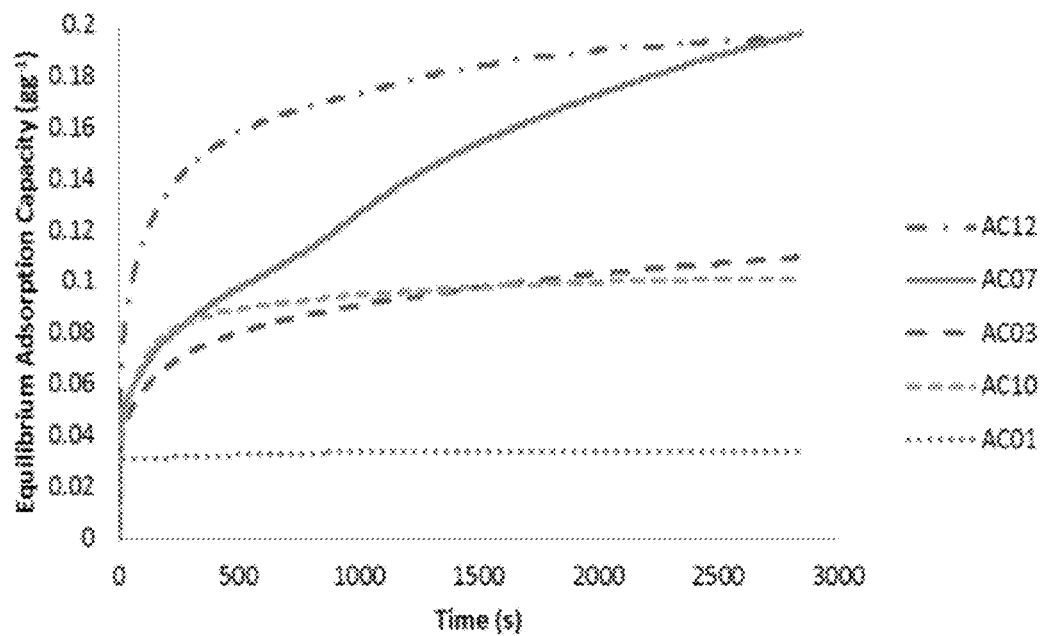
FIG. 7 illustrates graphs showing water adsorption rates of the AC01, AC03, AC07, AC10 and AC12 samples at 300 K and 750 Pa.
Figure 8:
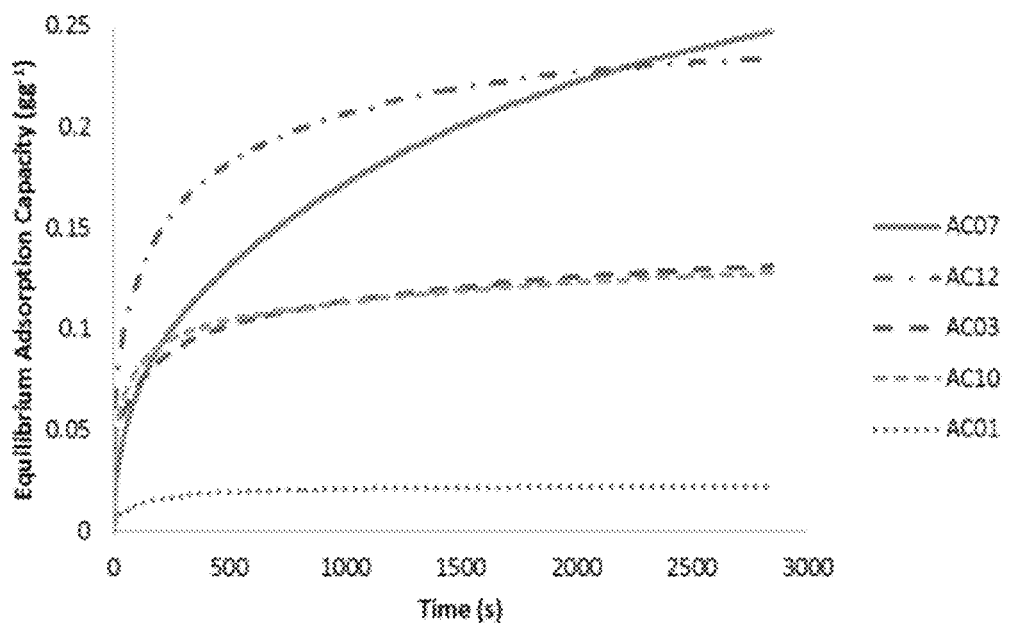
FIG. 8 illustrates graphs showing water vapor adsorption rates of the AC01, AC03, AC07, AC10 and AC12 samples at 300 K and 900 Pa.
Figure 9:
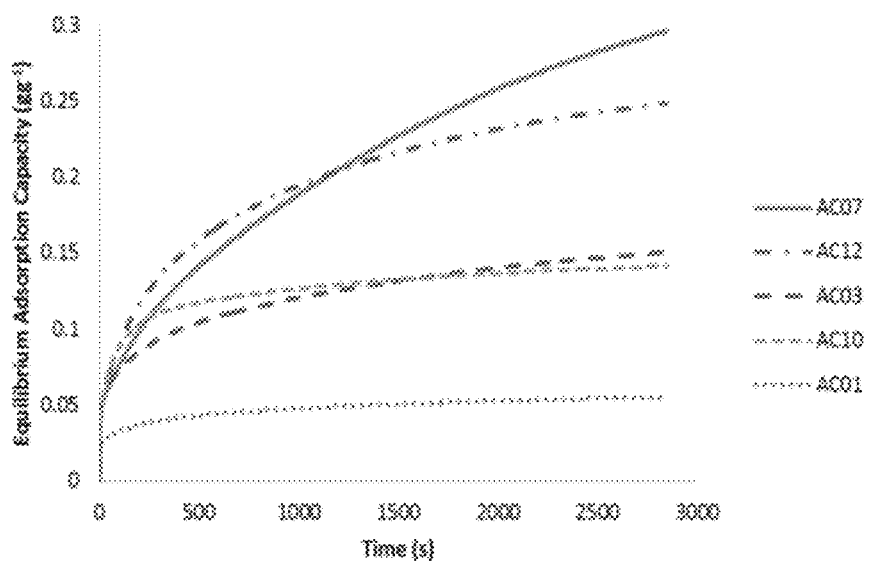
FIG. 9 illustrates graphs showing water vapor adsorption rates of the AC01, AC03, AC07, AC10 and AC12 samples at 300 K and 1000 Pa.
Figure 10:
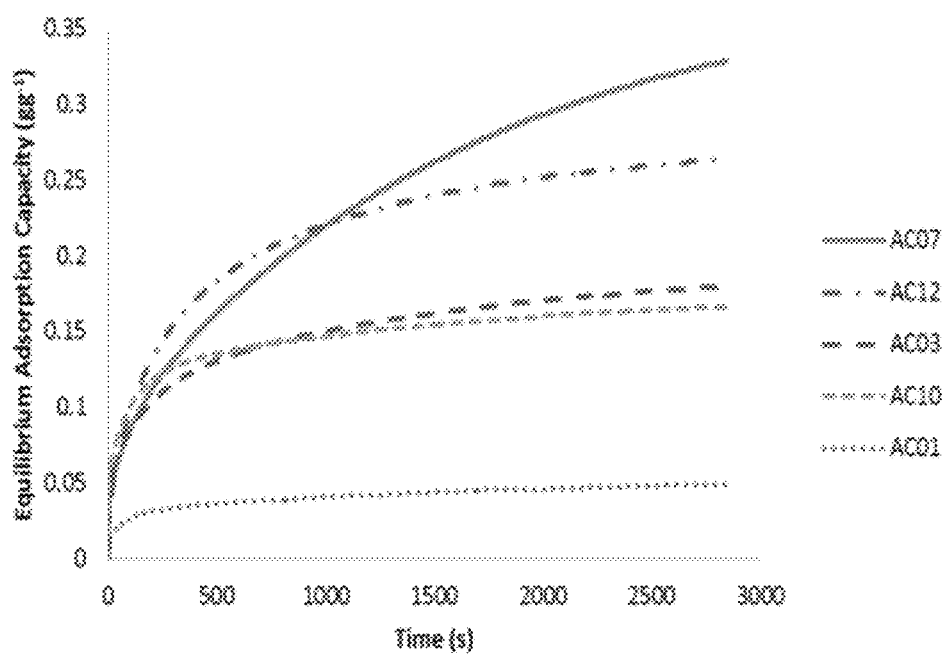
FIG. 10 illustrates graphs showing water vapor adsorption rates of the AC01, AC03, AC07, AC10 and AC12 samples at 300 K and 1100 Pa.

The adsorption capacity and the percent improvement as compared with raw activated carbon (control) were measured at various pressures, such as, 750 Pa, 900 Pa, 1000 Pa and 1100 Pa. It was found that the adsorption capacity of Control (AC01) at the pressure range from 200 to 1400 Pa was lower than that under pressure over 1600 Pa, the adsorption capacity increased slightly after 1600 Pa. The performance of Comparative Example 2 (AC03) was quite close to that of Example 6 (AC10), which both achieved the value of 0.13 g g$^{-1}$ at 900 Pa. However, the compositions of Comparative Example 2 (AC03) and Example 6 (AC10) were significantly different, as Comparative Example 2 (AC03) was not soaked in CaCl$_2$ solution. It could be concluded that soaking in a solution with only 10 wt. % CaCl$_2$ cannot improve water uptake performance. Therefore, Comparative Example 2 (AC03) and Example 6 (AC10) were inappropriate adsorbents for adsorption cooling systems. Example 3 (AC07) and Example 8 (AC12) showed the best adsorption capacity, much better than that of Control, Comparative Example 2 and Example 6. Example 3 (AC07) exhibited the highest adsorption capacity of 0.25 g g$^{-1}$, a 992% improvement over raw activated carbon at 900 Pa, as shown in Table 5. Example 8 (AC12) also has a reasonable adsorption capacity of 0.23 g g$^{-1}$, which was just slightly lower than Example 3 (AC07). However, the adsorption rate of Example 8 (AC12) was much higher than that of Example 3 (AC07), and in the lower pressure region (200 Pa-750 Pa), its adsorption capacity was higher as well. This was probably because Example 8 (AC12) contained more silica than Example 3 (AC07). This result again demonstrates that silica-gel could help improve the adsorption capacity at lower pressures region while CaCl$_2$ enhanced it at higher pressures. FIG. 6 also shows an S-shaped isotherm for Example 8 (AC12), and this further supports the idea that Example 8 (AC12) was the best composite adsorbent for adsorption cooling systems among other compositions. Therefore, the best optimized condition was obtained when the activated carbon was impregnated with 10 wt. % sodium silicate solution for 48 hours and 30 wt. % CaCl$_2$ solution for 48 hours (i.e., Example 8; Sample AC12) in which the adsorption capacity could reach 0.1948 g g$^{-1}$ making a 475% improvement (at 750 Pa), 0.2335 g g$^{-1}$ making a 933% improvement (at 900 Pa), 0.2485 g g$^{-1}$ making a 354% improvement (at 1000 Pa) and 0.2634 g g$^{-1}$ making a 432% improvement (at 1100 Pa), compared with the raw activated carbon based on low pressure TGA analysis. The results are shown in Table 5 and FIG. 6.

TABLE 5

The adsorption capacity and the percentage improvement compared with raw activated carbon at various pressures

| Sample | q (g g$^{-1}$) | Improvement | Sample | q (g g$^{-1}$) | Improvement |
|---|---|---|---|---|---|
| Water Vapor Pressure at 750 Pa | | | Water Vapor Pressure at 900 Pa | | |
| AC01 | 0.0339 | N.A. | AC01 | 0.0226 | N.A. |
| AC03 | 0.1097 | 234% | AC03 | 0.1319 | 484% |
| AC07 | 0.1971 | 481% | AC07 | 0.2468 | 992% |
| AC10 | 0.1012 | 199% | AC10 | 0.1281 | 467% |
| AC12 | 0.1948 | 475% | AC12 | 0.2335 | 933% |
| Water Vapor Pressure at 1000 Pa | | | Water Vapor Pressure at 1100 Pa | | |
| AC01 | 0.0547 | N.A. | AC01 | 0.0495 | N.A. |
| AC03 | 0.1506 | 175% | AC03 | 0.1804 | 264% |
| AC07 | 0.2965 | 442% | AC07 | 0.3289 | 564% |
| AC10 | 0.1413 | 158% | AC10 | 0.1664 | 236% |
| AC12 | 0.2485 | 354% | AC12 | 0.2634 | 432% |

Example 13

Adsorption Rate Coefficient

Figure 11:
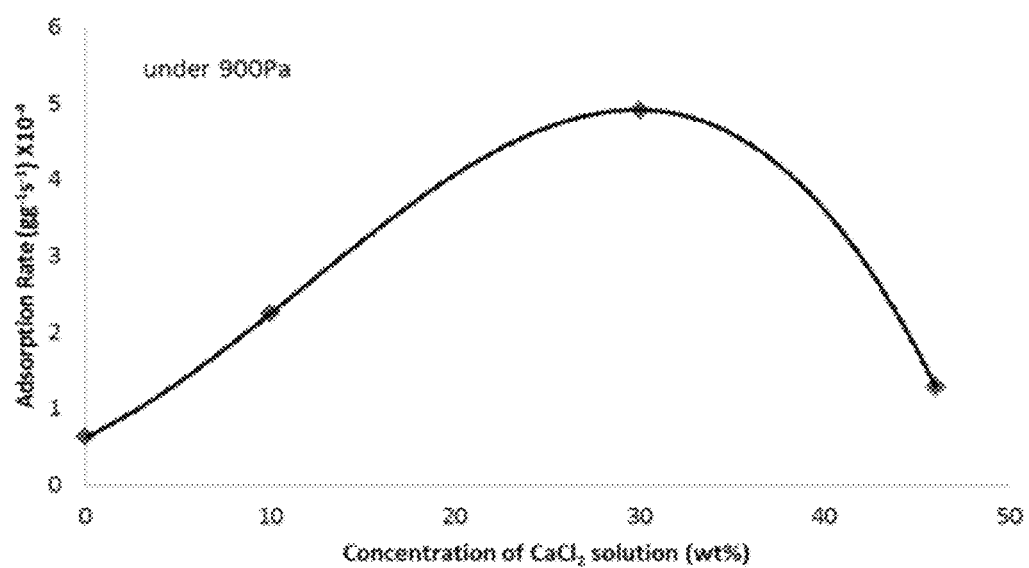
FIG. 11 illustrates the relationship between the adsorption rate and the concentration of $CaCl_2$ solution.

The adsorption isotherm curve, adsorption isobar curve and adsorption rate could be obtained from the adsorption rate tests. The adsorption rate coefficients of the samples, i.e., Examples 3 (AC07), 6 (AC10) and 8 (AC12) were measured, compared to Comparative Example 2 and Control, and the results are presented in Table 6. The relationship between the adsorption rate and the concentration of the CaCl$_2$ solution is shown in FIG. 11.

The adsorption rate of Example 8 (AC12) was clearly higher than that of Example 3 (AC07) in any pressure region because its specific surface area and total pore volume were much larger, as shown in Table 2. In other words, the adsorbate (water vapor) could be adsorbed quickly due to its fast diffusion process. This phenomenon was same for the Control of which the adsorption rate coefficients at 750 Pa and at 900 Pa were higher than Example 8 (AC12) in the same working condition. However, the adsorption rate coefficient of Control reduced sharply when the pressure level increased. This is because the Control can adsorb more water vapor increasingly with the pressure at the higher pressure level. Then, it took some time to saturate. Although the adsorption rate coefficients of Control at 750 Pa and at 900 Pa were the highest, its adsorption capacity was the poorest. Therefore, the optimized composition was prepared by impregnating the activated carbon with 10 wt. % sodium silicate solution for 48 hours and 30 wt. % CaCl$_2$ solution for 48 hours (i.e., Example 8; Sample AC12), which has an adsorption rate coefficient (K) of $1.3 \times 10^{-3}$ at 900 Pa.

TABLE 6

The adsorption rate coefficients of the preferred samples at 300 K.

| | Examples | | | | |
|---|---|---|---|---|---|
| | Control | Comparative Example 2 | Example 3 | Example 6 | Example 8 |
| | | | Sample Number | | |
| | AC01 | AC03 | AC07 | AC10 | AC12 |
| Adsorption Rate Coefficient (K) × $10^3$ at water vapor pressure 750 Pa | 4.1 | 0.9 | 0.9 | <u>1.2</u> | <u>1.2</u> |
| Adsorption Rate Coefficient (K) × $10^3$ at water vapor pressure 900 Pa | 2.3 | 1.0 | 1.0 | 1.0 | <u>1.3</u> |
| Adsorption Rate Coefficient (K) × $10^3$ at water vapor pressure 1000 Pa | 1.0 | 0.9 | 0.9 | 1.0 | <u>1.1</u> |
| Adsorption Rate Coefficient (K) × $10^3$ at water vapor pressure 1100 Pa | 0.9 | 1.0 | 1.0 | 1.0 | <u>1.2</u> |

Calculation Example

Example 14

Ideal COP and Average SCP

The ideal COP is equivalent to the cooling energy divided by the supplied energy, which is shown in equation (1) (Chan, K. C., Chao, C. Y. H., Sze-To G. N. and Hui K. S. 2012. Performance predictions for a new zeolite 13X/CaCl₂ composite adsorbent for adsorption cooling systems. *International Journal of Heat and Mass Transfer*, In Press. DOI.: 10.1016/j.ijheatmasstreansfer.2012.02.054.). This equation shows that the difference in equilibrium water uptake ($\Delta X$) has a positive effect on the performance of an adsorption cooling system. A larger $\Delta X$ results in a greater ideal COP. The adsorption isotherms give $\Delta X$ at the adsorption temperature (27° C.) and the desorption temperature (115° C.). Thus the ideal COP can be calculated as $$COP = \frac{E_{cooling}}{E_{supplied}} = \frac{\Delta x \cdot m_z \cdot h_{fg,adsorbate}}{m_z[C_{ac} + C_{ad} \cdot \Delta x](T_H - T_L) + \Delta x \cdot m_z \cdot h_{ad}} \quad (1)$$

$$COP = \frac{h_{fg,adsorbate}}{\left[\frac{C_{ac}}{\Delta x} + C_{ad}\right](T_H - T_L) + h_{ad}}$$

where $\Delta X$ is the difference in equilibrium water uptake between the adsorption and desorption phases; $m_z$ is the mass of composite adsorbent used in the adsorption cooling system; $h_{fg,adsorbate}$ is the latent heat of vaporization of water (2489 kJ kg⁻¹ at 5° C.); $C_{ac}$ and $C_{ad}$ are the specific heat capacities of the composite adsorbent and the adsorbate (1.09 kJ kg⁻¹ K⁻¹ and 4.186 kJ kg⁻¹ K⁻¹, respectively); $T_H$–$T_L$ is the temperature difference of the composite adsorbent between the adsorption and desorption phases (approximately 88 K) and $h_{ad}$ is the adsorption heat of the composite adsorbent which is calculated from the equilibrium between the chemical potential for the gas and the adsorbent (Ruthven, D. M., 2008, Fundamental of adsorption equilibrium and kinetics in microporous solids. *Molecular Sieves*. 7, 1-43.). Clausius-Clapeyron equation is used to develop the equilibrium of chemical potential (Ko, D., Siriwardane, R., Biegler, L. T., 2002. Optimization of a Pressure-Swing Adsorption Process Using Zeolite 13X for CO2 Sequestration. *Industrial and Engineering Chemistry Research*. 42, 339-348.). On average, the value of the adsorption heat of the composite adsorbent is about 2885 kJ kg⁻¹. According to equation (1), the ideal COP of Control was about 0.37, while composite adsorbent Example 8 (AC12) could achieve 0.70, an 89% improvement. The details are shown in Table 7.

The adsorption rate is proportional to the specific cooling power (SCP), which is defined as the cooling load divided by the mass of adsorbent. The cooling load is given by (Chan, K. C., Chao, C. Y. H., Sze-To G. N. and Hui K. S. 2012. Performance predictions for a new zeolite 13X/CaCl₂ composite adsorbent for adsorption cooling systems. *International Journal of Heat and Mass Transfer*, In Press. DOI.: 10.1016/j.ijheatmasstreansfer.2012.02.054.)

$$Q = \dot{m}_{ad} m_z h_{fg,adsorbate} \quad (2)$$

where Q is the cooling load in Watts; $\dot{m}_{ad}$ is the unit adsorption rate in kilograms of adsorbate per kilogram of adsorbent in one second and the value of $\dot{m}_{ad}$ is calculated based on the experimental example result of adsorption rate coefficient (K) as shown in Table 6.; $m_x$ is the mass of adsorbent in kg and $h_{fg,adsorbate}$ is the latent heat of vaporization of water vapor (2489 kJ kg⁻¹ at 5° C.). The SCP is given by:

$$SCP = \dot{m}_{ad} h_{fg,adsorbate} \quad (3)$$

The average SCP can also be calculated as:

$$\overline{SCP} = \frac{\int_0^{w_{eq}} \dot{m}_{ad} h_{fg \cdot water} dw}{\int_0^{w_{eq}} dw}. \quad (4)$$

Therefore, the higher the adsorption rate, the higher the SCP that can be obtained in an adsorption cooling system. The results are shown in Table 7. Example 8 (AC12) had the highest SCP of 378 W kg⁻¹, a 482% improvement over the Control.

TABLE 7

The average SCP and ideal COP of the preferred samples at 900 Pa.

| | Examples | | | | |
|---|---|---|---|---|---|
| | Control | Comparative Example 2 | Example 3 | Example 6 | Example 8 |
| | | | Sample Number | | |
| | AC01 | AC03 | AC07 | AC10 | AC12 |
| Avg. SCP (W kg⁻¹) | 65 | 164 | 307 | 159 | <u>378</u> |
| % Improvement | N.A. | 152% | 372% | 145% | <u>482%</u> |
| Ideal COP | 0.37 | 0.65 | 0.71 | 0.65 | <u>0.70</u> |
| % Improvement | N.A. | 76% | 92% | 76% | <u>89%</u> |

As demonstrated by the test data presented in this application, the presently provided composite adsorbent material has an adsorption capacity significantly higher than other composite adsorbents known in the art by at least about 50%. Currently, only silica-gel is commercially used in the adsorption cooling and dehumidification systems. The performance of the composite adsorbent is more stable for use in adsorption chiller and dehumidification systems and it can adsorb a huge amount of water vapor in the low pressure region as well as high pressure region. It can adsorb up to 0.23 g of water vapor per gram of dry composite adsorbent under 900 Pa, which is higher than silica-gel of 0.2 g g-1 and much higher than activated carbon of 0.02 g g-1 under the same working condition.

In addition, desorption temperature for silica-gel is around 100° C. However, it is always below 100° C. for the present composite adsorbent material based on the results from the TGA experiment.

Apart from the adsorption capacity and desorption temperature characteristics, the thermal conductivity of the present composite adsorbent is also higher than that of silica-gel. It is because $CaCl_2$ and silica-gel filled in the space between the activated carbon molecules, which created paths for heat transfer. This is another advantage of making the present composite adsorbent. The thermal conductivity of the present composite adsorbent is around 1.5 W m$^{-1}$ K$^{-1}$, which is at least 3 times higher than that of silica-gel.

With the information contained herein, various departures from precise description of the present subject matter will be readily apparent to those skilled in the art to which the subject matter pertains, without departing from the spirit and the scope of the present subject matter claimed below. The present subject matter is not to be considered limited in scope to the procedures, properties or components defined, since the preferred embodiments and other descriptions are intended only to be illustrative of particular aspects of the presently provided subject matter. Indeed, various modifications of the described modes for carrying out the present subject matter which are obvious to those skilled in molecular biology or related fields are intended to be within the scope of the following claims.

What is claimed is:

1. A composite adsorbent material, comprising:
a porous host material of activated carbon impregnated with silica-gel and calcium chloride, the composite adsorbent material providing adsorption in adsorption cooling systems or dehumidification systems, wherein the composite adsorbent material comprises the activated carbon, as a host material, impregnated with the silica-gel, followed by further impregnating the silica-gel coated host material with the calcium chloride, thereby rendering a structure of the obtained silica activated carbon impregnated with the calcium chloride, the impregnation of the activated carbon with silica-gel increasing performance of adsorption capacity at a lower pressure region and the subsequent impregnation of the host material with the calcium chloride subsequent to impregnation with silica-gel providing increased adsorption capacity toward water vapor, with the impregnating the calcium chloride into the silica-gel helping the calcium chloride to maintain its solid structure which would otherwise result from the calcium chloride forming a solution with water vapor, the subsequent impregnation of the host material with the calcium chloride subsequent to impregnation with silica-gel further increasing the overall performance of adsorption capacity at a wider pressure range.

2. The composite adsorbent material of claim 1, further comprising a porous host material of activated carbon impregnated with silica-gel and calcium chloride, wherein the porous host material has an average pore size ranging from about 5 Å to about 20 Å in diameter.

3. The composite adsorbent material of claim 1, further comprising a porous host material of activated carbon impregnated with silica-gel and calcium chloride, wherein the porous host material has about 0.43 cm$^3$ g$^{-1}$ of microporosity.

4. The composite adsorbent material of claim 1, further comprising a porous host material of activated carbon impregnated with silica-gel and calcium chloride, wherein the porous host material has about 0.44 cm$^3$ g$^{-1}$ of mesoporosity.

5. The composite adsorbent material of claim 1, further comprising a porous host material of activated carbon impregnated with silica-gel and calcium chloride, wherein the porous host material has about 0.02 cm$^3$ g$^{-1}$ of macroporosity.

6. The composite adsorbent material of claim 1 having a size ranging from about 20 to about 40 mesh in diameter.

7. The composite adsorbent material of claim 1, wherein the porous host material is in the form of activated carbon granules.

8. The composite adsorbent material of claim 1, wherein the porous host material has a total pore volume from about 0.4 cm$^3$ g$^{-1}$ to about 1.0 cm$^3$ g$^{-1}$.

9. The composite adsorbent material of claim 1, further comprising a porous host material of activated carbon impregnated with silica-gel and calcium chloride, the composite adsorbent material providing adsorption in adsorption cooling systems or dehumidification systems, wherein the total pore volume is about 0.5 cm$^3$ g$^{-1}$.

10. The composite adsorbent material of claim 1, wherein the porous host material has a total surface area of from about 1100 m$^2$ g$^{-1}$ to about 1200 m$^2$ g$^{-1}$.

11. The composite adsorbent material of claim 10, wherein the total surface area is about 1120 m$^2$ g$^{-1}$.

12. A composite adsorbent material, comprising:
a porous host material of activated carbon impregnated with silica-gel and calcium chloride,
wherein the composite adsorbent material comprises the activated carbon, as a host material, impregnated with the silica-gel, followed by further impregnating the silica-gel coated host material with the calcium chloride, thereby rendering a structure of the obtained silica activated carbon impregnated with the calcium chloride, the impregnation of the activated carbon with silica-gel increasing performance of adsorption capacity at a lower pressure region and the subsequent impregnation of the host material with the calcium chloride subsequent to impregnation with silica-gel providing increased adsorption capacity toward water vapor, with the impregnating the calcium chloride into the silica-gel helping the calcium chloride to maintain its solid structure which would otherwise result from the calcium chloride forming a solution with water vapor, the subsequent impregnation of the host material with the calcium chloride subsequent to impregnation with silica-gel further increasing the overall performance of adsorption capacity at a wider pressure range,
and wherein the composite adsorbent material has a capability of adsorbing at least about 0.86 gram of water vapor for every gram of said composite adsorbent material at room pressure for using in open dehumidification systems.

13. A composite adsorbent material, comprising:
a porous host material of activated carbon impregnated with silica-gel and calcium chloride,
wherein the composite adsorbent material comprises the activated carbon, as a host material, impregnated with the silica-gel, followed by further impregnating the silica-gel coated host material with the calcium chloride, thereby rendering a structure of the obtained silica activated carbon impregnated with the calcium chloride, the impregnation of the activated carbon with silica-gel increasing performance of adsorption capacity at a lower pressure region and the subsequent impregnation of the host material with the calcium chloride subsequent to impregnation with silica-gel providing increased adsorption capacity toward water vapor, with the impregnating the calcium chloride into the silica-gel helping the calcium chloride to maintain its solid structure which would otherwise result from the calcium chloride forming a solution with water vapor, the subsequent impregnation of the host material with the calcium chloride subsequent to impregnation with silica-gel further increasing the overall performance of adsorption capacity at a wider pressure range, and wherein the composite adsorbent material has a capability of adsorbing at least about 0.23 gram of water vapor for every gram of said composite adsorbent material under 900 Pa level low pressure condition for using in adsorption cooling closed systems.

14. An adsorption cooling system comprising the composite adsorbent material of claim 1, wherein the composite adsorbent material has a maximum adsorption rate at a concentration of about 30 wt. % of calcium chloride solutions.

15. An adsorption cooling and dehumidification system comprising the composite adsorbent material of claim 1, wherein the composite adsorbent material shows an S-shape adsorption isotherm curve.

16. An adsorption cooling system comprising the composite adsorbent material of claim 1, wherein the composite adsorbent material has an ideal coefficient of performance (COP) of 0.7.

17. An adsorption cooling system comprising the composite adsorbent material of claim 1, wherein the composite adsorbent material has an average specific cooling power (SCP) of 378 W Kg$^{-1}$.

18. An adsorption dehumidification system comprising the composite adsorbent material of claim 1, comprising about 30 to about 35 wt. % of activated carbon, about 2 to about 10 wt. % of silica-gel and about 55 to about 68 wt. % of $CaCl_2$.

19. An adsorption cooling system comprising the composite adsorbent material claim 1, wherein the composite adsorbent comprises about 60 to about 70 wt. % of activated carbon, about 10 to about 15 wt. % of silica-gel and about 15 to about 30 wt. % of $CaCl_2$.

20. The composite adsorbent material of claim 1 further comprising a metal impregnated onto the activated carbon.

21. The composite adsorbent material of claim 20, wherein the metal is copper or aluminum.

22. An adsorption dehumidification system comprising the composite adsorbent material of claim 1, wherein the composite adsorbent material provides a cooling or temperature/humidity control.

23. A method of preparing the composite adsorbent material of claim 1 comprising: preparing a porous host material of activated carbon and impregnating the porous host material with a sodium silicate solution, followed by a $CaCl_2$ solution.

24. A method of preparing the composite adsorbent material of claim 1 used for dehumidification systems, comprising: preparing a porous host material of activated carbon, impregnating the porous host material with about 10 wt. % of a sodium silicate solution for about 48 hours, followed by about 46 wt. % of a $CaCl_2$ solution for about 72 hours.

25. A method of preparing the composite adsorbent material of claim 1 used in adsorption cooling systems, comprising: preparing porous activated carbon and impregnating the porous activated carbon with about 10 wt. % of a sodium silicate solution for about 48 hours, followed by about 30 wt. % of a $CaCl_2$ solution for about 48 hours.

26. A humidity-controlling system comprising a desiccant wheel dehumidification unit, where water is used as an adsorbate and the composite adsorbent material of claim 1 is used as an adsorbent.

27. A cooling or temperature-controlling system comprising an adsorption unit, where water, methanol and ammonia are used as adsorbates and the composite adsorbent material of claim 1 is used as an adsorbent.

28. An adsorption cooling system comprising the composite adsorbent material of claim 1.

* * * * *